(12) United States Patent
Li et al.

(10) Patent No.: US 8,488,919 B1
(45) Date of Patent: Jul. 16, 2013

(54) APPARATUS FOR COMBINING MULTIPLE SIGNALS AS DEPOLARIZED OUTPUT

(75) Inventors: Yao Li, Fremont, CA (US); Xingzhong Wang, Cupertino, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 737 days.

(21) Appl. No.: 12/350,185

(22) Filed: Jan. 7, 2009

(51) Int. Cl.
*G02B 6/00* (2006.01)

(52) U.S. Cl.
USPC .......................................................... 385/11

(58) Field of Classification Search
USPC .......................................................... 385/11
See application file for complete search history.

(56) References Cited

U.S. PATENT DOCUMENTS

| 6,205,262 | B1 * | 3/2001 | Shen | 385/11 |
| 7,092,595 | B2 * | 8/2006 | Sorin et al. | 385/24 |
| 2007/0280693 | A1 * | 12/2007 | Meyer | 398/79 |

* cited by examiner

*Primary Examiner* — Uyen Chau N Le
*Assistant Examiner* — Hoang Tran
(74) *Attorney, Agent, or Firm* — Joe Zheng

(57) ABSTRACT

The present invention is related to designs of optical devices for combining optical signals or sources at different wavelengths to generate depolarized outputs combining the optical signals. According to one aspect of the present invention, an optical apparatus comprises N different inputs, each having a wavelength and a combining mechanism receiving the N different inputs and combining the N different inputs to produce N outputs, each of the outputs being coupled to a series of optical recirculation depolarizers to produce combined and depolarized outputs.

7 Claims, 9 Drawing Sheets

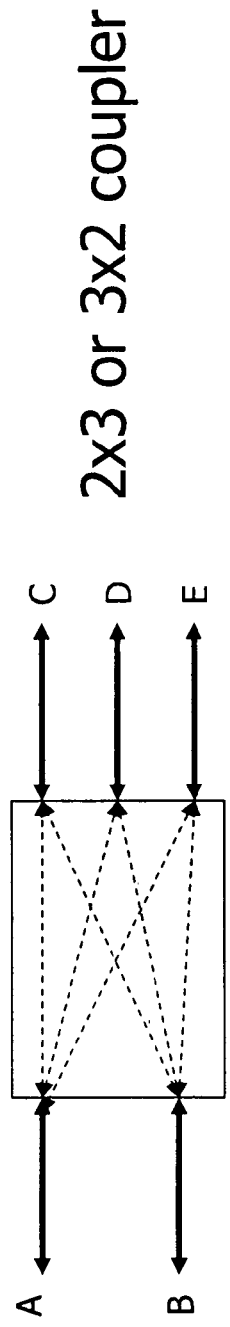
FIG. 3C
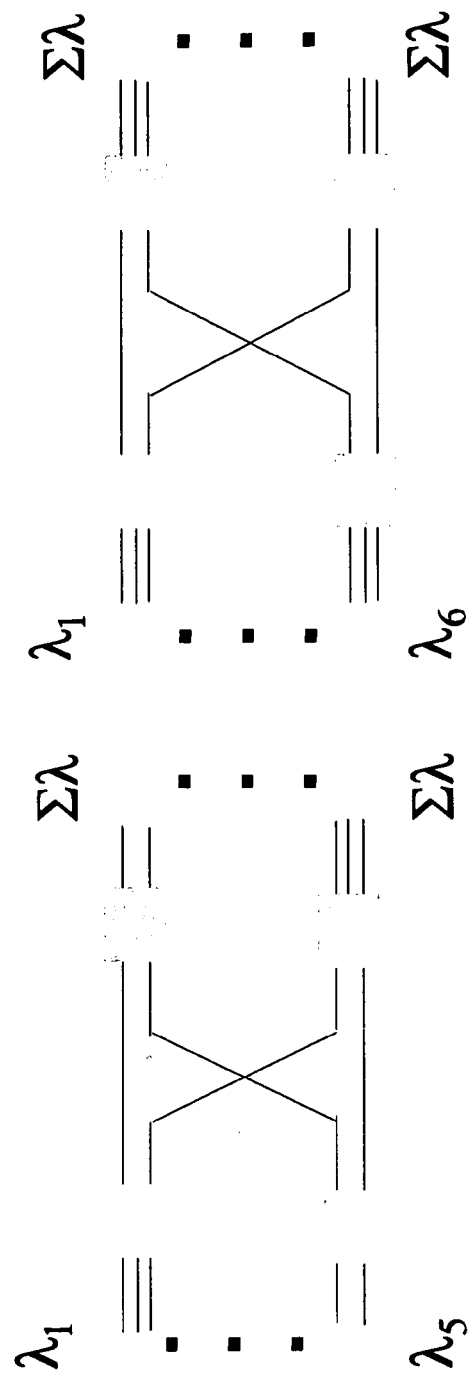
FIG. 3D
FIG. 3E

Outer Cross Over

Inner Cross Over

Inner-Inner Crossover

Inner-Outer Crossover

Outer-Inner Crossover

Outer-Outer Crossover

US 8,488,919 B1

APPARATUS FOR COMBINING MULTIPLE SIGNALS AS DEPOLARIZED OUTPUT

BACKGROUND OF THE INVENTION

1. Field of the Invention

The invention is generally related to the area of optical systems and devices. In particular, the invention is related to method and apparatus for combining multiple signals as depolarized output.

2. The Background of Related Art

In optical communication applications, wider spectrums are often used, thus a single light source is not sufficient to cover the entire application demanded spectrum. A typical scenario is the so-called fiber-to-the-home (FTTH) applications where optical signals are needed and defined in a broad spectrum from 1260 nm to 1625 nm range. However, even the super luminescence light-emitting diode (SLED) can only cover <80 nm of spectrum and thus several of them are needed to provide a wide enough spectrum light source.

FIG. 1A shows a prior art approach 100 of combing multiple wavelength spectra light sources (e.g., four wavelengths $\lambda 1$, $\lambda 2$, $\lambda 3$, and $\lambda 4$ light sources) by using two stages of couplers (also referred to as 2×1 couplers), wherein the first stage of couplers 102 and 104 each combine two light sources, the second stage combines the outputs from the first stage. Because each stage causes 50% loss in power, accordingly, FIG. 1B shows a 6 dB loss in the curve of the combined output 108.

FIG. 2A shows another prior art approach 200 of combing multiple wavelength spectra light sources (e.g., four wavelengths $\lambda 1$, $\lambda 2$, $\lambda 3$, and $\lambda 4$ light sources) by using two WDM filters 202 and 204 and a coupler 206, wherein two WDM filters 202 and 204 combine $\lambda 1$, $\lambda 2$, $\lambda 3$, and $\lambda 4$ light sources and output two combined light sources that are coupled together by the coupler 206. As shown in FIG. 2B, the total power loss is around 4 dB as the WDM filters 202 and 204 are typically less than 1 dB in power loss.

It is known in the art that the cost of a WDM filter is a lot more expensive than that of a coupler, but using couplers would introduce more power loss. Furthermore, all these prior arts are limited to providing only one output port and discard or waste other outputs. For many practical manufacturing and other applications where several users need such power light sources, multiple of these devices are needed. Thus there is need for a design that captures all or part of the wasted powers to recycle them for multiple identical output port light source applications, in addition to other benefits and advantages to be appreciated described herein.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices for combining optical signals or sources at different wavelengths to generate depolarized outputs combining the optical signals. According to one aspect of the present invention, an optical apparatus comprises N different inputs, each having a wavelength and a combining mechanism receiving the N different inputs and combining the N different inputs to produce N outputs, each of the outputs being coupled to a series of optical recirculation depolarizers to produce combined and depolarized outputs.

In another aspect of the present invention, the different inputs are respectively depolarized first before being coupled to the combining mechanism. Depending on implementation, the combining mechanism may be implemented with couplers arranged in various structures.

The present invention may be implemented as an apparatus or a part of a system. According to one embodiment, the present invention is an optical apparatus comprising: N different inputs, each having a wavelength and depolarized via to a series of optical recirculation depolarizers; and a combining mechanism receiving the N different inputs and combining the N different inputs to produce N outputs, each of the outputs being coupled to another series of optical recirculation depolarizers to produce combined and depolarized outputs.

There are numerous benefits, features, and advantages in the present invention. These benefits, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3C shows a 2×3 or 3×2 coupler that may combine two inputs into three outputs or three outputs to two inputs;

FIG. 3D shows the use of the 3×2 couples with 2×2 couples to combine five inputs to generate five outputs, each producing a combination of these five inputs;

FIG. 3E shows the use of four of 3×2 couples to combine six inputs to generate six outputs, each producing a combination of these six inputs;

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 3-8. However, those skilled in the art will readily appreciate that the detailed description given herein with respect to these figures is for explanatory purposes as the invention extends beyond these limited embodiments.

Figure 1A:
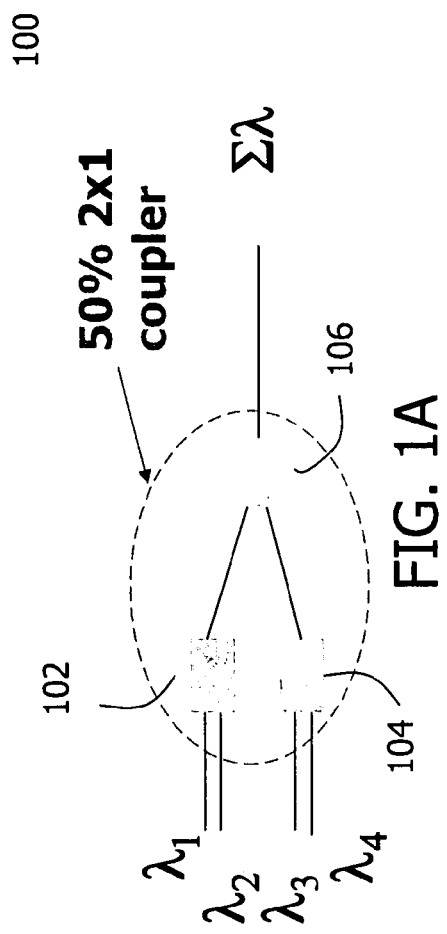
FIG. 1A shows a prior art approach of combing multiple wavelength spectra light sources (e.g., four wavelengths $\lambda 1$, $\lambda 2$, $\lambda 3$, and $\lambda 4$ light sources) by using two stages of couplers (also referred to as 2×1 couplers)
Figure 1B:
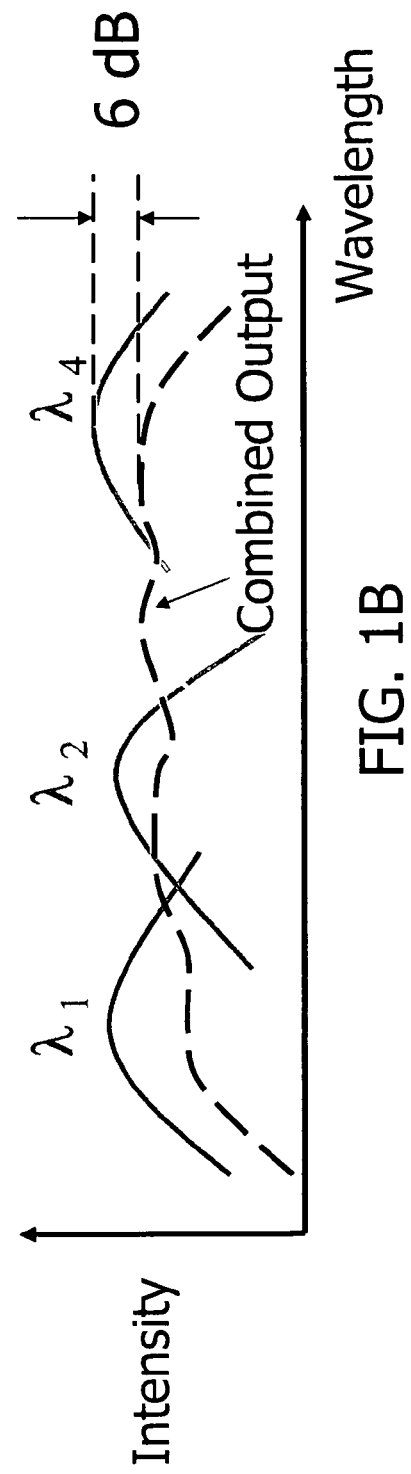
FIG. 1B shows a 6 dB loss in the curve of a combined output from FIG. 1A.
Figure 2A:
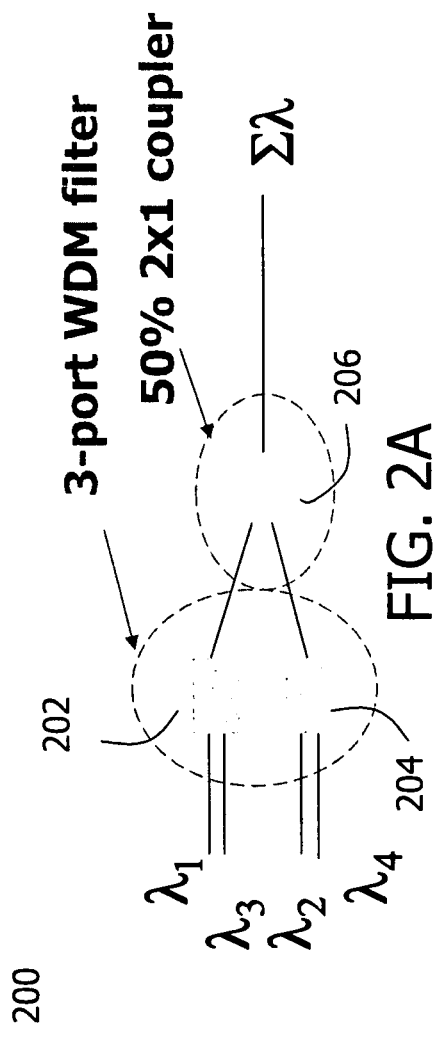
FIG. 2A shows another prior art approach of combing multiple wavelength spectra light sources (e.g., four wavelengths $\lambda 1$, $\lambda 2$, $\lambda 3$, and $\lambda 4$ light sources) by using two WDM filters and a coupler.
Figure 2B:
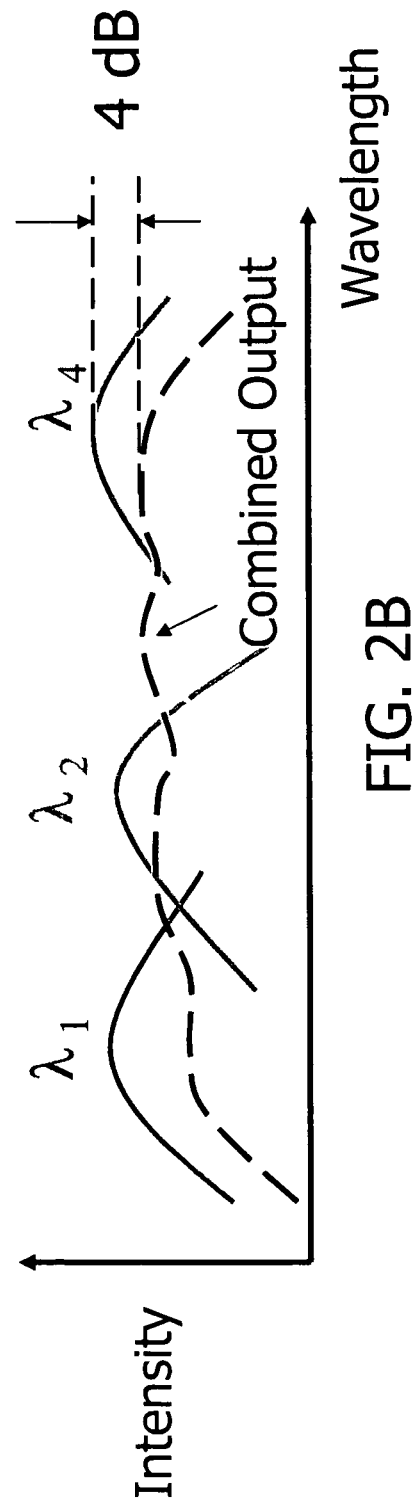
FIG. 2B shows a total power loss is around 4 dB as the WDM filters are typically less than 1 dB in power loss.
Figure 3A:
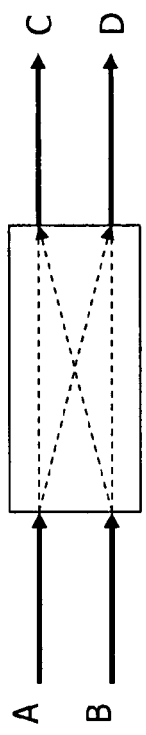
FIG. 3A shows a four-port directional coupler that is also denoted as a 2×2 coupler and considered as a simplest coupler.

FIG. 3A shows a four-port directional coupler 300 that is also denoted as a 2×2 coupler and considered as a simplest coupler. A light arrives for instance at port A and is split between port C and D. In the most common case, 50% of the light power will go in C and D.

Figure 3B:
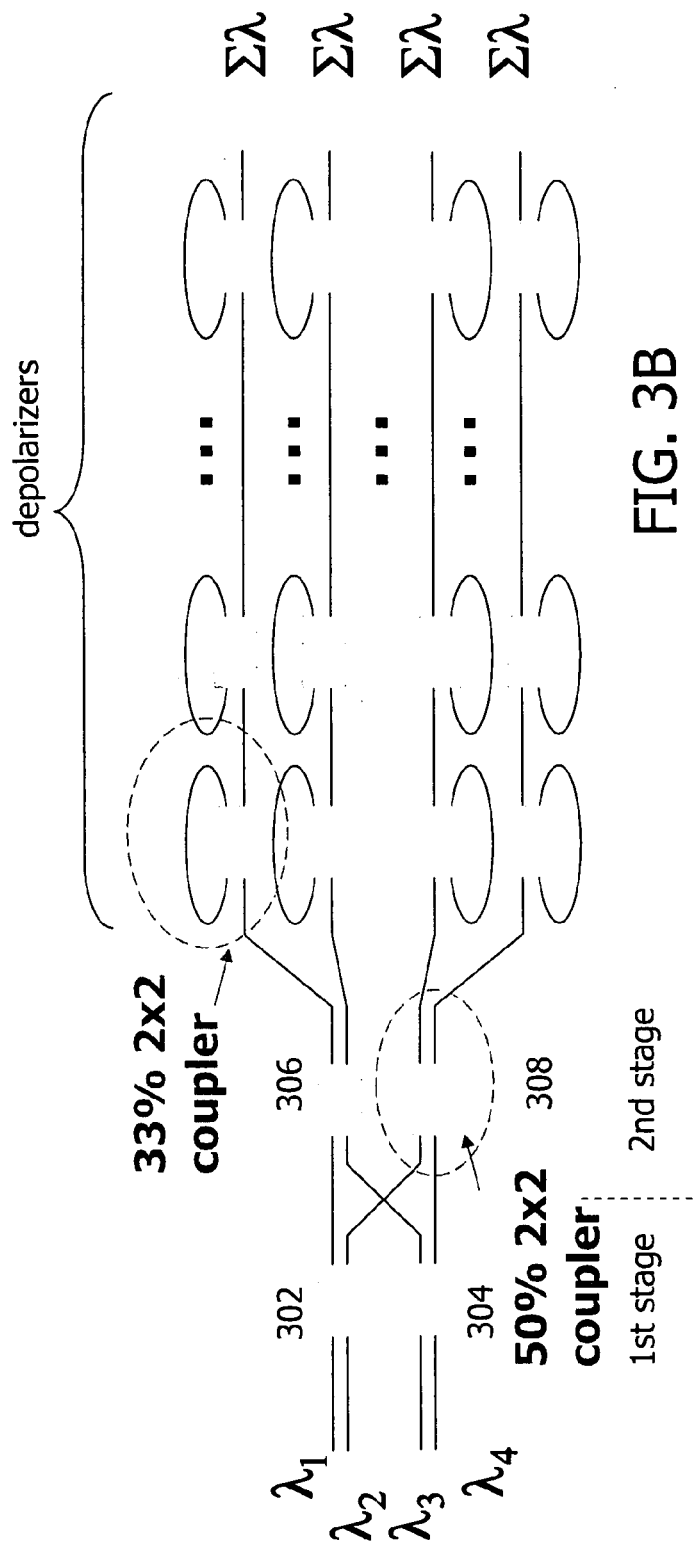
FIG. 3B shows a design of using four couplers in combining four different wavelengths $\lambda 1$, $\lambda 2$, $\lambda 3$, and $\lambda 4$ (light sources) to produce four combined and polarized light sources.

FIG. 3B shows a design of using four couplers in combining four different wavelengths $\lambda 1$, $\lambda 2$, $\lambda 3$, and $\lambda 4$ (light sources) to produce four combined and polarized light sources. Using two stages of couplers 302, 304, 306 and 308, the four different wavelength light sources are combined. In operation, the first stage including two couplers 302 and 304 outputs $\lambda 1+\lambda 2$, $\lambda 1+\lambda 2$, $\lambda 3+\lambda 4$ and $\lambda 3+\lambda 4$ combined signals that are coupled to a second stage including two couplers 306 and 308. The second stages outputs four substantially similar combined signals $\lambda 1+\lambda 2+\lambda 3+\lambda 4$.

The combined signals are then coupled to a series of optical recirculation depolarizers. In one embodiment, each of the depolarizers is formed from optical fibers (e.g., single mode fiber optic cables) and a coupler (e.g., a fused single mode fiber coupler). Each fiber coupler has an input pair of fibers and an output pair of fibers. One of the output fibers is coupled to one of the input fibers to form a recirculation loop. The recirculation loop allows a degree of polarization in the output beam to be varied across a wide spectrum of values. Further, the amount of the circulated output is controlled (e.g., from 33%~66%). Details of such depolarizers are described in U.S. Pat. No. 5,933,555 which is hereby incorporated by reference.

As shown in FIG. 3A, using 2×2 optical couplers instead of 2×1 couplers in 2 stages, equal power level and equal spectra outputs can be generated. Thus, there are four outputs available, each is coupled to a series of optical recirculation depolarizers to produce a depolarized output.

Many applications for broad-band light sources are in testing areas. Not only are the power levels important, but also the polarization uniformity is critical for many of these applications. The so-called polarization dependent loss (PDL) is the power level difference between two orthogonal polarization states of the same light source. Many of such light sources use super luminescence light emitting diode (SLED) which is a light emitting device similar to laser diode in the sense that their power output are much stronger than that of the pure LED due to the use of some levels of lasing gains in LED. Thus these SLEDs typically have some level of polarization preferences. The use of them directly may cause testing inaccuracy by PDL. Thus, in addition to the strong combined spectra and power, it is also ideal for the broad-band source to be polarization independent. The inclusion of the optical recirculation depolarizers makes the broad-band source fairly polarization free.

FIG. 3C shows a 2×3 or 3×2 coupler that may combine two inputs into three outputs or three outputs to two inputs. FIG. 3D shows the use of the 3×2 couples with 2×2 couples to combine five inputs to generate five outputs, each producing a combination of these five inputs. FIG. 3E shows the use of four of these 3×2 couples to combine six inputs to generate six outputs, each producing a combination of these six inputs.

Figure 4:
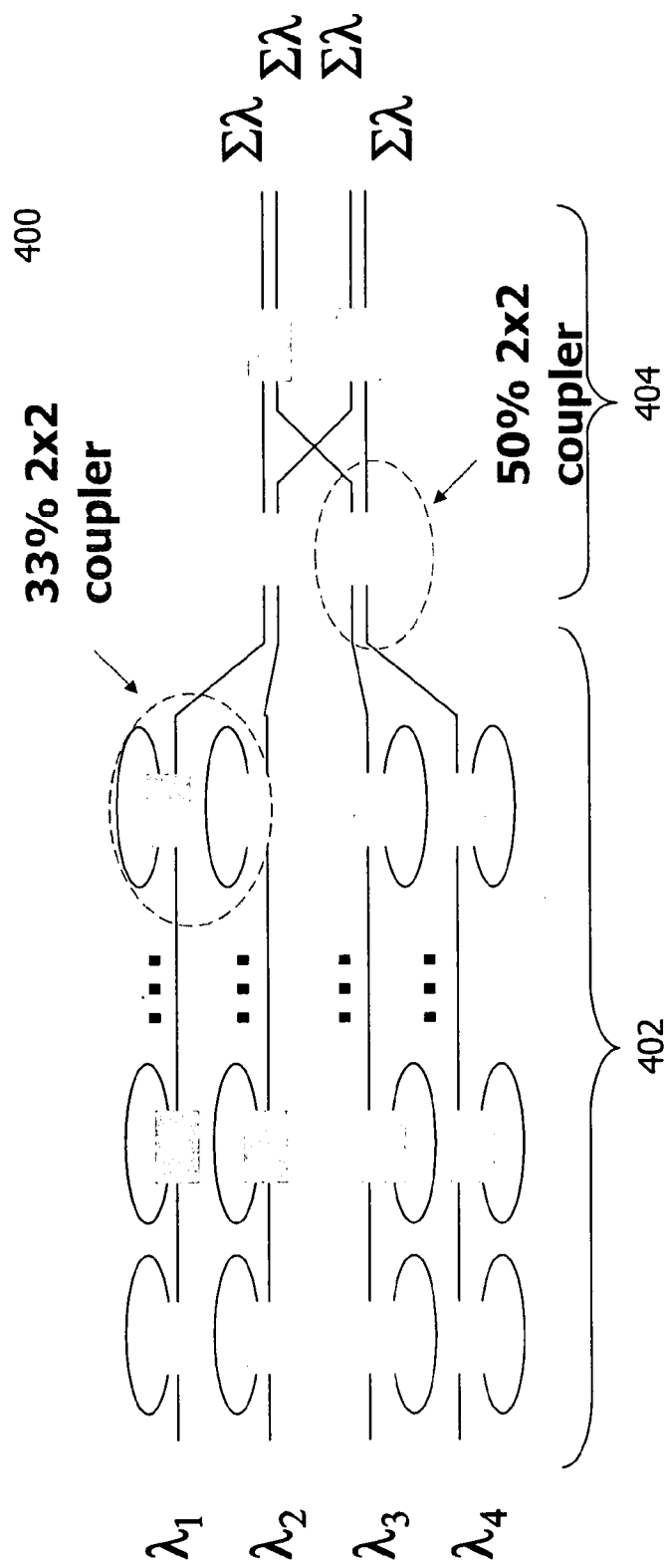
FIG. 4 shows another embodiment of having four inputs, each depolarized first via a series of optical recirculation depolarizers.

FIG. 4 shows another embodiment 400 of having four inputs, each depolarized first via a series of optical recirculation depolarizers 402. The outputs from the depolarizers are then coupled to the two stages of couplers 404. Two couplers in the second stage output four depolarized combined signals, each having the combined wavelengths (e.g., $\lambda 1+\lambda 2+\lambda 3+\lambda 4$).

Figure 5:
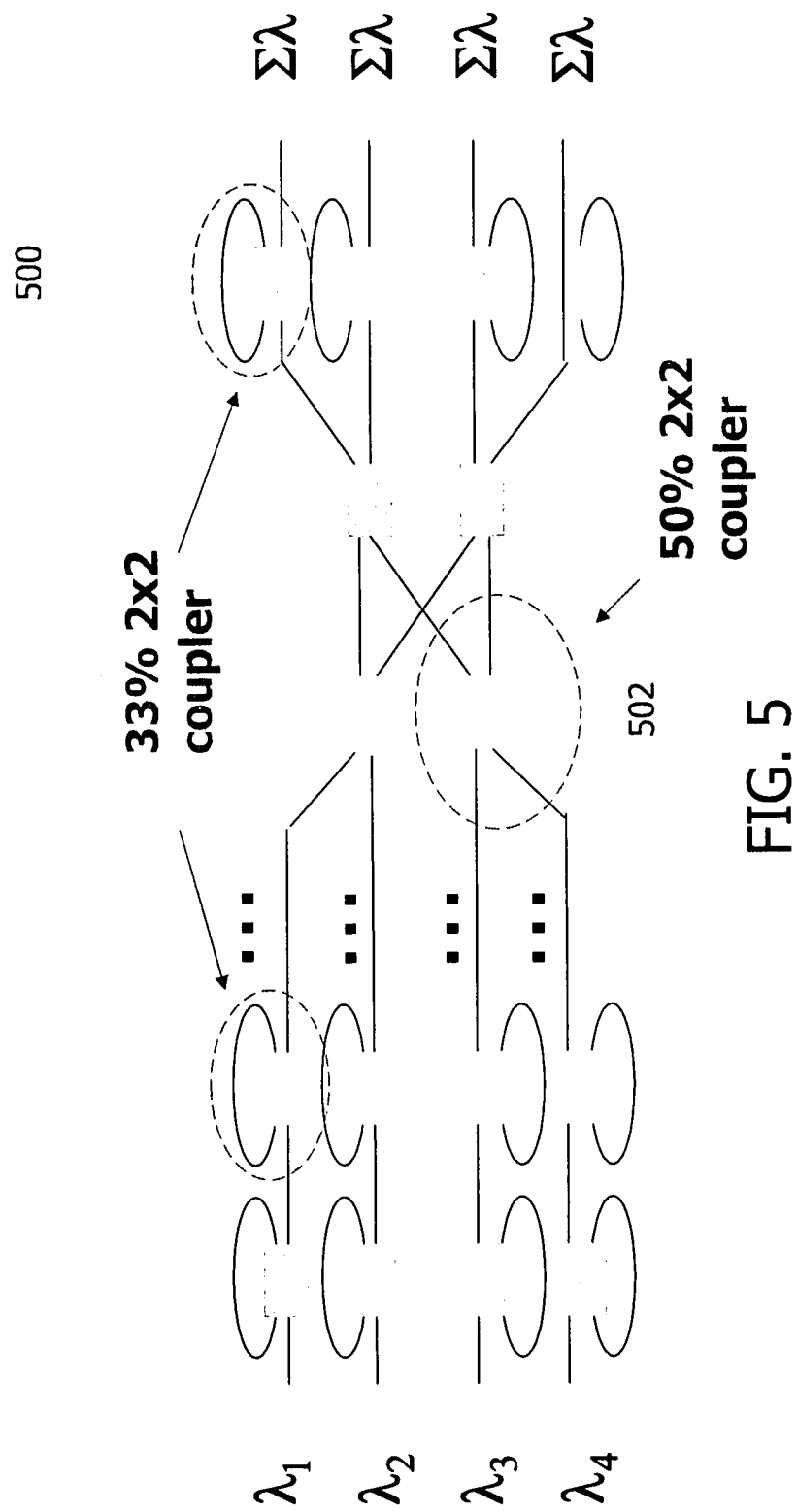
FIG. 5 shows a sandwiched structure that embeds two stages of couplers in a series of depolarizers.

FIG. 5 shows a sandwiched structure 500 that embeds the two stages of couplers 502 in the depolarizers. Specifically, FIG. 5 shows four input signals are depolarized first, the outputs therefrom are coupled to the couplers 502. The output from the couplers 502 are further depolarized by one or more of the depolarizers.

Figure 6B:
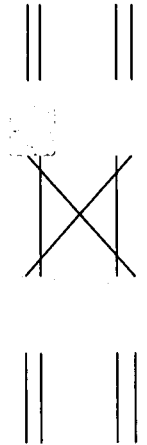
FIG. 6A and FIG. 6B show respectively two possibilities, respectively referred to as inner cross-over structure and outer cross-over structure.
Figure 6A:
Figure 7:
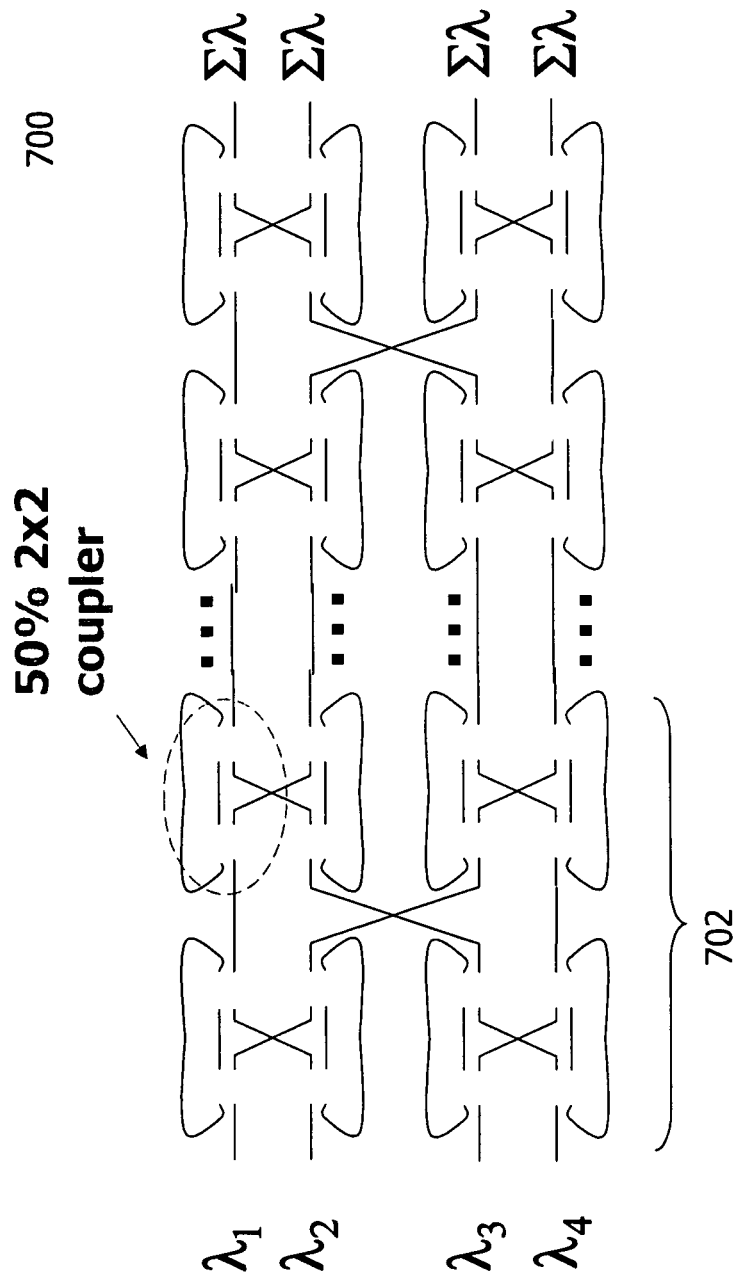
FIG. 7 shows an embodiment based on 2×2 couplers with 50% coupling ratio.
Figure 8A:
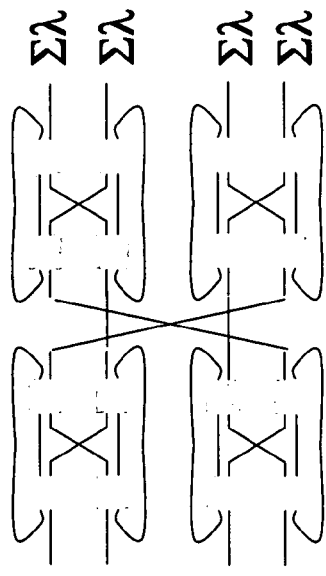
FIGS. 8A, 8B, 8C and 8D show, respectively, four possible configurations that are formed by changing the two inputs and two outputs of the couplers.
Figure 8B:
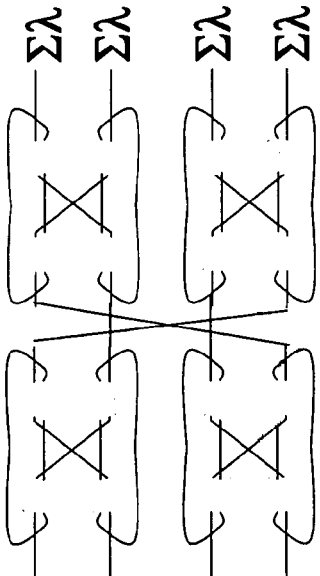
Figure 8C:
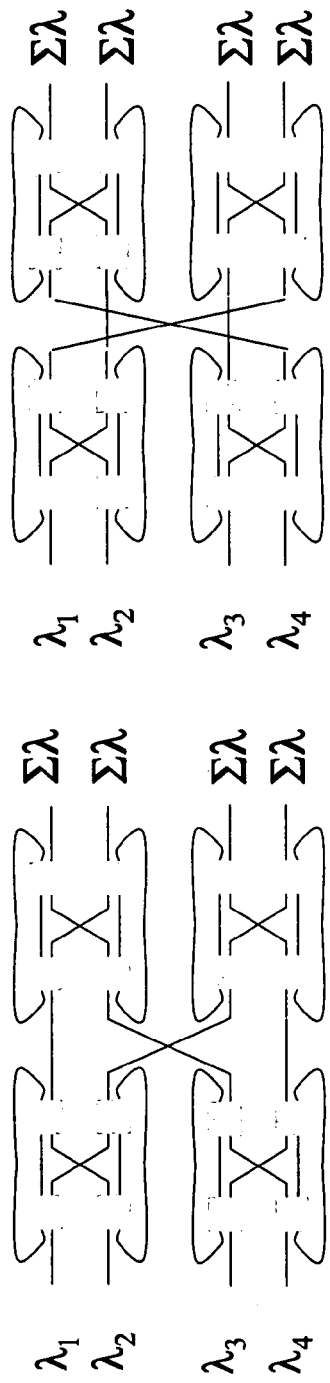
Figure 8D:
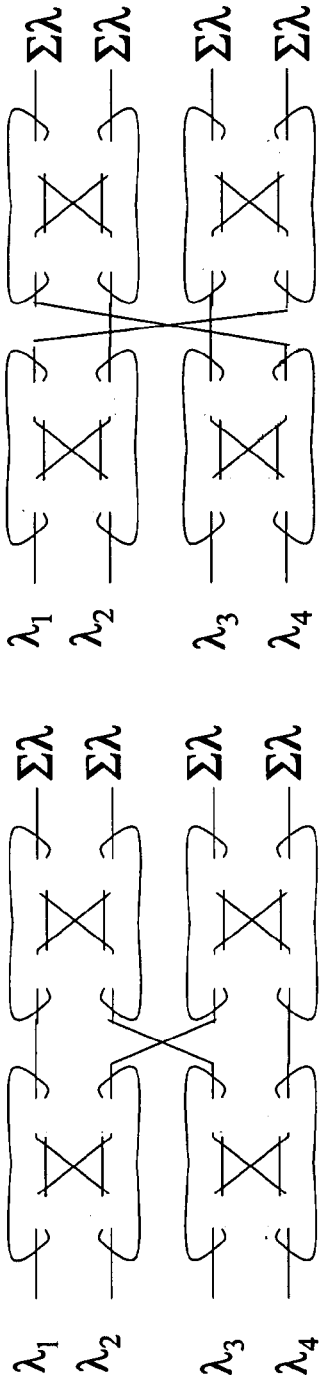

As far as the couplers are concerned, there are also ways to combine two inputs. FIG. 6A and FIG. 6B show respectively two possibilities, respectively referred to as inner cross-over structure and outer cross-over structure. Beside using the above described combination of a spectrum combiners (e.g., couplers) and separate depolarizers, 2×2 couplers may be used to serve the same purpose of the spectrum combining function and depolarizing function in a more integrated way. FIG. 7 shows an embodiment 700 based on 2×2 couplers with 50% coupling ratio. Various 2×2 couplers are formed to provide inner and outer feed-back loops, the depolarizing functions are thus achieved through feed-forward lines from other 2×2 couplers. The first group 702 including 16 couplers form a basic unit, this unit can be cascaded further to further perform spectrum combination and depolarization.

By changing the two inputs and two outputs of the couplers, there may be four possible configurations, respectively labeled and shown in FIGS. 8A, 8B, 8C and 8D. More specifically, with inner and outer feed-back loops formed by various 2×2 couplers, the depolarizing functions are achieved through feed-forward lines from other 2×2 couplers. The 16 couplers in any of the four configurations in FIGS. 8A, 8B, 8C and 8D can be used as a basic unit and they can be cascaded either directly or mixed in such cascade to further perform spectrum combination and depolarization. The more stages used, the larger the loss but the better the depolarized light outputs.

It should be noted that the current invention is largely described in terms of four inputs with four different wavelengths to generate four combined depolarized outputs. Those skilled in the art shall understand that given a number of inputs and outputs, it is not difficult to figure out the number of stages or couplers that are needed to produce the outputs. For example, when there are four inputs, there need two stages, each includes two couplers. Logically, when there are N inputs, there will be N/2 stages, each includes N/2 couplers.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a single port 602 is shown in FIG. 6, there may be multiple ports, each of the ports is structured similar to those ports 604. Accordingly, the scope of the present invention is defined by the appended claims rather than the foregoing description of embodiments.

What we claim:

1. An optical apparatus comprising:
    N input ports to receive respectively N different inputs provided externally, the N different inputs having N different wavelengths, thus each of the N different inputs having only one of the N different wavelengths, each of the N input ports receiving one of the N different inputs, where N is an integer greater than 2; and
    a combiner mechanism including at least two optical couplers in parallel to receive the N different inputs simultaneously and combine the N different inputs to produce N outputs, each of the N outputs from the at least two optical couplers including a portion of each of the N different inputs and a combination of the different wavelengths, each of the N outputs being coupled to a series of optical recirculation depolarizers to produce N combined and depolarized outputs from the N outputs.

2. The optical apparatus as recited in claim 1, wherein the combiner mechanism includes N/2 stages, each of the stages including N/2 couplers, each of the N/2 couplers having two inputs and two outputs, where the two inputs receive two input signals with different wavelengths and the two outputs provide substantially similar mixed signals of the two input signals.

3. The optical apparatus as recited in claim 2, wherein each of the couplers is a 2×2 coupler with 50% coupling ratio.

4. The optical apparatus as recited in claim 1, wherein the combiner mechanism includes N/2 stages, each of the stages including N/2 couplers, each of the N/2 couplers having two inputs and two outputs, the two outputs are coupled to two couplers in a subsequent stage in at least two ways.

5. The optical apparatus as recited in claim 4, wherein the at least two ways include an inner cross-over structure and an outer cross-over structure.

6. The optical apparatus as recited in claim 1, wherein the optical recirculation depolarizers include groups of couplers arranged in an inner cross-over structure or an outer cross-over structure.

7. The optical apparatus as recited in claim 1, wherein the optical recirculation depolarizers include groups of couplers, at least two of the couplers arranged in parallel providing a feedback loop are 33% 2×2 couplers.

* * * * *